US012114220B2

(12) United States Patent
Marupaduga

(10) Patent No.: US 12,114,220 B2
(45) Date of Patent: *Oct. 8, 2024

(54) USER EQUIPMENT (UE) ROAMING BASED ON NETWORK PERFORMANCE

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 18/159,411

(22) Filed: Jan. 25, 2023

(65) Prior Publication Data
US 2023/0164654 A1    May 25, 2023

Related U.S. Application Data

(63) Continuation of application No. 17/146,644, filed on Jan. 12, 2021, now Pat. No. 11,570,677.

(51) Int. Cl.
*H04W 36/14* (2009.01)
*H04W 36/00* (2009.01)
*H04W 36/30* (2009.01)
*H04W 36/36* (2009.01)

(52) U.S. Cl.
CPC ....... *H04W 36/14* (2013.01); *H04W 36/0085* (2018.08); *H04W 36/30* (2013.01); *H04W 36/36* (2013.01)

(58) Field of Classification Search
CPC . H04W 36/14; H04W 36/0085; H04W 36/30; H04W 36/36; H04W 8/24; H04W 36/00835; H04W 36/00837; Y02D 30/70
See application file for complete search history.

(56) References Cited

U.S. PATENT DOCUMENTS

| | | | |
|---|---|---|---|
| 8,417,242 B2 | 4/2013 | Cormier et al. | |
| 9,137,654 B1 | 9/2015 | Qu et al. | |
| 9,253,704 B1 | 2/2016 | Sarkar et al. | |
| 9,414,430 B2 | 8/2016 | Vajapeyam et al. | |
| 9,674,754 B2 | 6/2017 | Fitzpatrick et al. | |
| 9,775,079 B2 | 9/2017 | Cheng et al. | |
| 9,900,832 B2 | 2/2018 | Kim et al. | |
| 10,039,039 B2 | 7/2018 | Cho et al. | |
| 10,070,361 B2 | 9/2018 | Fukuta et al. | |
| 10,419,961 B2 | 9/2019 | Lee et al. | |
| 10,433,359 B2 | 10/2019 | Adjakple et al. | |

(Continued)

FOREIGN PATENT DOCUMENTS

BR    112016007665 A2 *  8/2017   ........... H04L 5/0055

*Primary Examiner* — Charles N Appiah
*Assistant Examiner* — Frank E Donado

(57) ABSTRACT

A wireless user device selects wireless networks. The wireless user device determines signal strength for the wireless networks and identifies candidate ones of the wireless networks based on their signal strength. The wireless user device obtains performance information for the candidate wireless networks that comprises data throughput, error rate, band fading, and/or intermodulation. The wireless user device selects one of the candidate wireless networks based on the performance information. The wireless user device wirelessly exchanges data with the selected one of the candidate wireless networks.

20 Claims, 10 Drawing Sheets

(56) References Cited

U.S. PATENT DOCUMENTS

| | | | |
|---|---|---|---|
| 2010/0167724 A1* | 7/2010 | Haran | H04W 48/12 |
| | | | 455/432.3 |
| 2010/0273485 A1 | 10/2010 | Huang et al. | |
| 2012/0196644 A1* | 8/2012 | Scherzer | H04W 72/02 |
| | | | 455/524 |
| 2014/0080539 A1* | 3/2014 | Scherzer | H04W 72/02 |
| | | | 455/525 |
| 2014/0220967 A1 | 8/2014 | Pankajakshan et al. | |
| 2015/0065133 A1 | 3/2015 | Cui et al. | |
| 2015/0350875 A1* | 12/2015 | Chhabra | H04W 36/00835 |
| | | | 455/432.1 |
| 2016/0014632 A1 | 1/2016 | Siow et al. | |
| 2016/0277974 A1 | 9/2016 | Persson et al. | |
| 2017/0272995 A1* | 9/2017 | Kim | H04L 65/612 |
| 2017/0359771 A1* | 12/2017 | Andreoli-Fang | H04W 48/20 |
| 2018/0220340 A1 | 8/2018 | Ramachandra et al. | |
| 2020/0196214 A1* | 6/2020 | Martinez-Heath | H04L 47/24 |
| 2020/0196322 A1* | 6/2020 | Logan | H04W 8/02 |

* cited by examiner

USER EQUIPMENT (UE) ROAMING BASED ON NETWORK PERFORMANCE

RELATED CASES

This United States patent application is a continuation of U.S. patent application Ser. No. 17/146,644 that was filed on Jan. 12, 2021 and is entitled "USER EQUIPMENT (UE) ROAMING BASED ON NETWORK PERFORMANCE." U.S. patent application Ser. No. 17/146,644 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN).

Wireless user devices register with the wireless communication networks to receive the wireless data services. The wireless communication network that a wireless user device is registered with is referred to as a "home wireless network." When the wireless user device is unable to establish a wireless connection with its home wireless network, the wireless user device will typically attach to a different wireless communications network referred to as a "visitor wireless network." When the wireless user device is served by the visitor wireless network, the wireless user device is roaming. Typically, wireless user devices will roam when the signal strength of the home wireless network is too weak for wireless data services.

When wireless user devices attach to a wireless access node, the wireless access node becomes loaded. An increase in load decreases the ability of the wireless access node to provide wireless data service to the wireless user devices. With the increase in the amount of wireless user devices, the load in the wireless access nodes has also increased. The wireless user devices are faced with the problem of trying to receive wireless data services with the increase in load. Moreover, wireless user devices which subscribe to premium wireless data services struggle to receive their premium services from heavily loaded networks. Unfortunately, the wireless user devices do not effectively and efficiently roam given the increase in load.

TECHNICAL OVERVIEW

A wireless user device selects wireless networks. The wireless user device determines signal strength for the wireless networks and identifies candidate ones of the wireless networks based on their signal strength. The wireless user device obtains performance information for the candidate wireless networks that comprises data throughput, error rate, band fading, and/or intermodulation. The wireless user device selects one of the candidate wireless networks based on the performance information. The wireless user device wirelessly exchanges data with the selected one of the candidate wireless networks.

DETAILED DESCRIPTION

Figure 1:
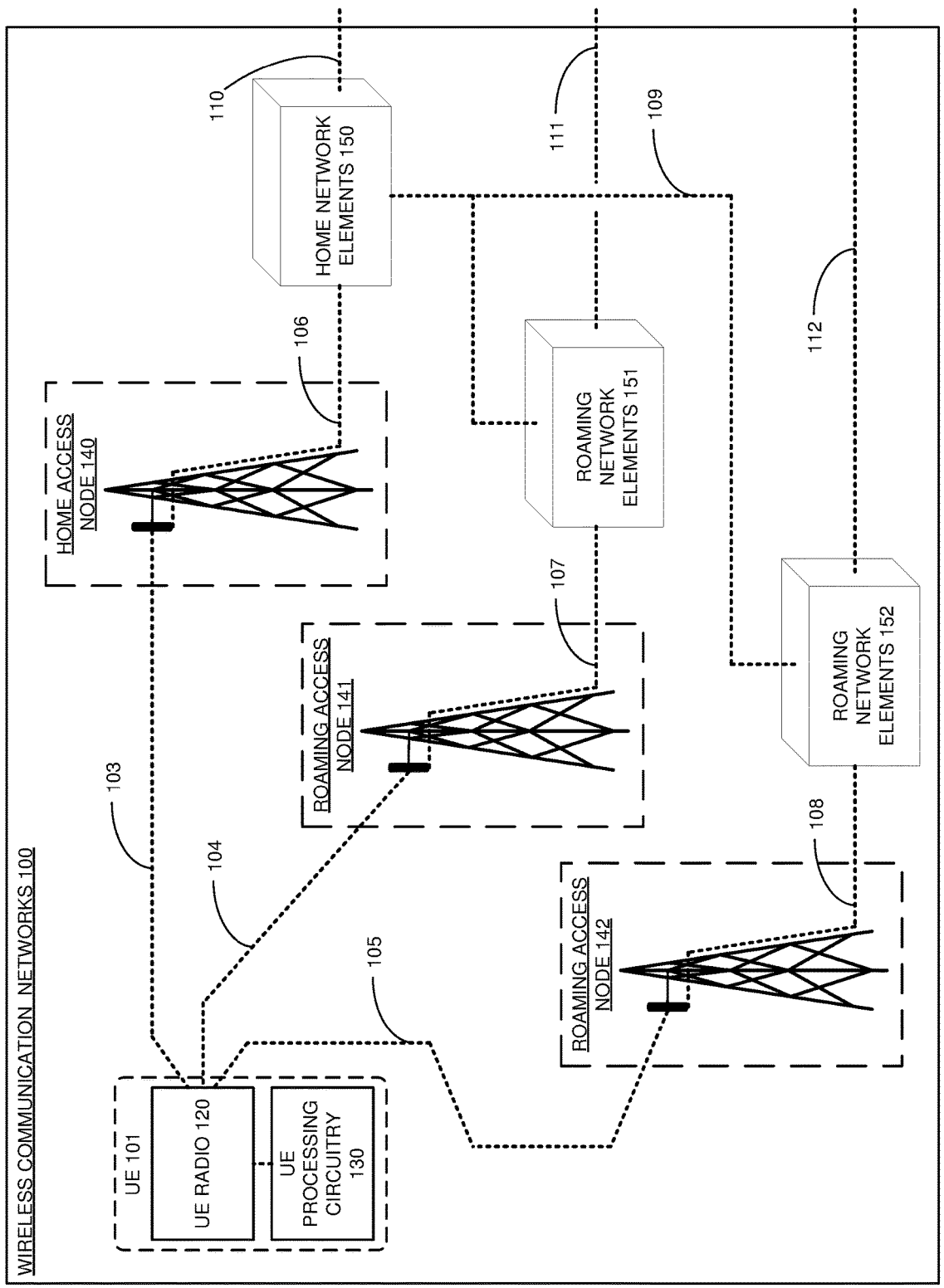
FIG. 1 illustrates a wireless User Equipment (UE) to hand over to a roaming wireless network based on network performance.

FIG. 1 illustrates wireless communication networks 100. Wireless communication networks 100 provide wireless data services to UE 101 like machine-control, internet-access, media-streaming, social-networking, and/or some other type of wireless networking product. Wireless communication networks 100 comprise wireless UE 101, links 103-112, home access node 140, roaming access nodes 141-142, home network elements 150, and roaming network elements 151-152. Wireless UE 101 comprises UE radio 120 and UE processing circuitry 130.

Various examples of network operation and configuration are described herein. In some examples, UE radio 120 wirelessly transfers UE capabilities of UE 101 to home access node 140. Radio 120 wirelessly receives performance information from home access node 140 for the home access node 140 and performance information for roaming access nodes 141-142. Radio 120 measures signal strengths for roaming access nodes 141-142. Radio 120 transfers the performance information to UE processing circuitry 130. Radio 120 transfers the signal strengths for roaming access nodes 141-142 to UE processing circuitry 130. UE processing circuitry 130 receives the signal strengths for roaming access nodes 141-142 and the performance information for home access node 140 and roaming access nodes 141-142. UE processing circuitry 130 determines candidate roaming access nodes from roaming access nodes 141-142 based on the signal strengths. For example, UE processing circuitry 130 may determine that roaming access node 141 is a candidate roaming access node when the signal strength of roaming access node 141 is strong enough to support wireless data services. UE processing circuitry 130 determines performance differentials between home access node 140 and the candidate roaming access nodes based on the performance information for home access node 140 and the performance information for the candidate roaming access nodes. For example, UE processing circuitry 130 may utilize a data structure to compare the network throughput for home access node 140 to the network throughputs for roaming access nodes 141-142 to determine the performance differentials. UE processing circuitry 130 ranks the candidate roaming access nodes based on the performance differentials. When at least one of the performance differentials exceeds a performance differential threshold, UE processing circuitry 130 generates a handover request to attach to the candidate roaming access node with the largest performance differential. UE processing circuitry 130 transfers the handover request to UE radio 120. UE radio 120 wirelessly transfers the handover request to the home access node 140. Advantageously, UE 101 effectively and efficiently generates a handover request to attach to a roaming wireless access node in response to network performance differentials between the home and roaming wireless access nodes.

UE 101 comprises antennas, amplifiers, filters, modulation, analog/digital interfaces, microprocessors, software, memories, transceivers, bus circuitry, and the like. Access nodes 140-142 and network elements 150-152 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication networks 100 as described herein. Although UEs 101 is depicted as a smartphone, UE 101 might instead comprise a computer, robot, vehicle, or other data appliances with wireless communication circuitry.

Access nodes 140-142 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, 5G EN-DC access nodes, Long Term Evolution (LTE) eNodeBs, WIFI hotspots, Low-Power Wide Area Network (LP-WAN) nodes, and/or some other wireless network apparatus. Access nodes 140-142 are geographically dispersed, however access nodes 140-142 may be co-located. Network elements 150-152 comprise User Plane Functions (UPFs), Access and Mobility Management Function (AMFs), System Architecture Evolution Gateways (SAE GWs), Mobility Management Entities (MMEs), and/or some other network apparatus. Access nodes 140-142 are depicted as towers, but access nodes 140-142 may use other mounting structures or no mounting structure at all.

Wireless links 103-105 use over-the-air air electromagnetic frequencies in the low-band, mid-band, high-band, or some other portion of the electromagnetic spectrum. Wireless links 103-105 use protocols like 5GNR, LTE, MMW, Institute of Electrical and Electronic Engineers (IEEE) 802.11 (WIFI), LP-WAN, and/or some other format of wireless protocol. Links 106-112 use metal, glass, air, or some other media. Links 106-112 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 103-112 may comprise intermediate network elements like relays, routers, and controllers.

Figure 2:
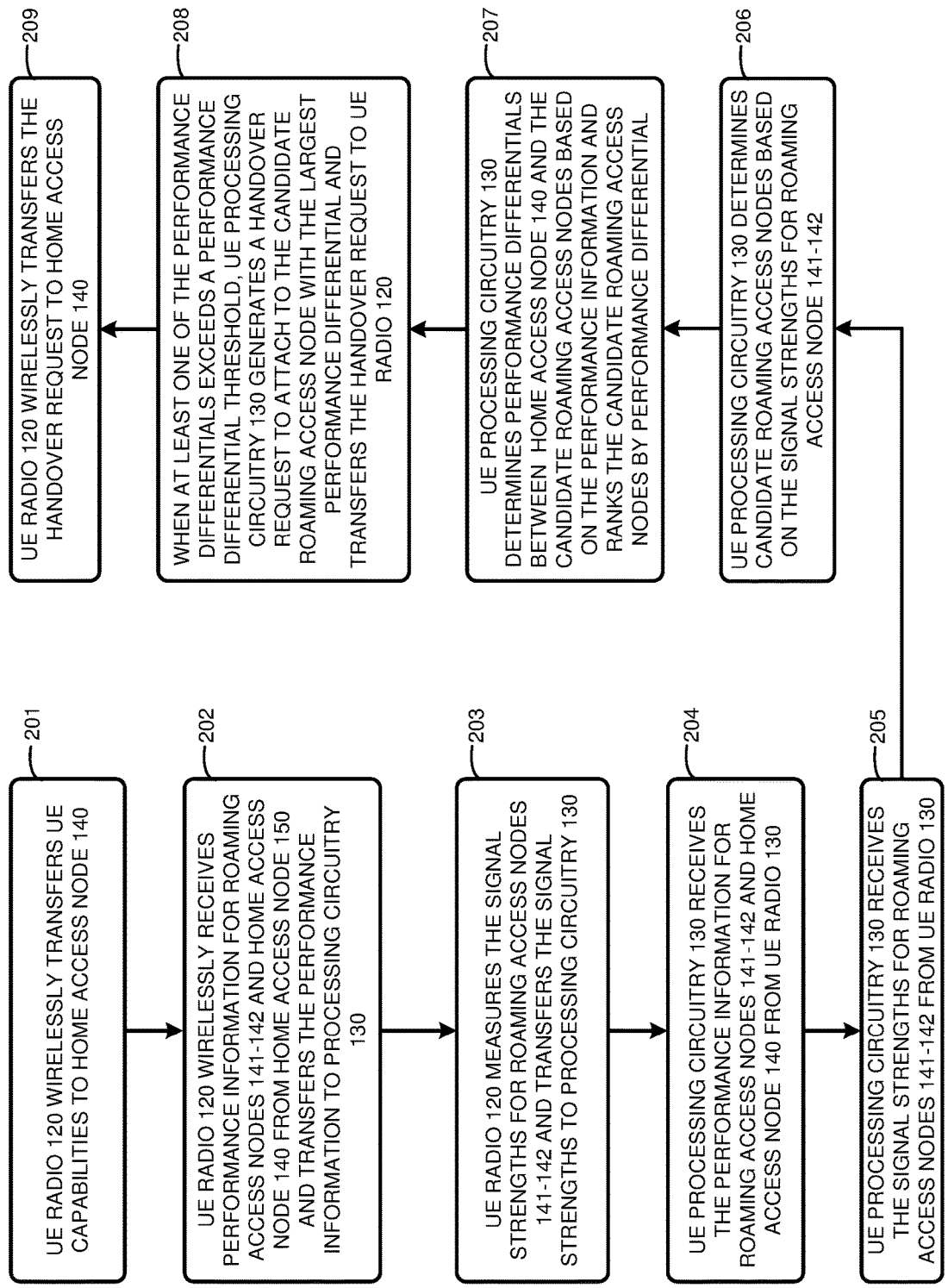
FIG. 2 illustrates an exemplary operation of the wireless UE to hand over to a roaming wireless network based on network performance.

FIG. 2 illustrates an exemplary operation of UE 101 to hand over to a roaming access node based on network performance. In other examples, the operation and structure of wireless UE 101 may be different. UE radio 120 wirelessly transfers UE capabilities to home access node 140 (201). UE radio 120 wirelessly receives performance information for roaming access nodes 141-142 and home access node 140 from home access node 140 and transfers the performance information to UE processing circuitry 130 (202). For example, the performance information may indicate network error rate, network throughput, and/or other network performance indicators for access nodes 140-142. UE radio 120 measures the signal strengths for roaming access nodes 141-142 and transfers the signal strengths to processing circuitry 130 (203).

UE processing circuitry 130 receives the performance information for roaming access nodes 141-142 and home access node 140 from UE radio 120 (204). UE processing circuitry 130 receives the signal strengths for roaming access nodes 141-142 from UE radio 130 (205). UE processing circuitry 130 determines candidate roaming access nodes based on the signal strengths for roaming access node 141-142 (206). For example, UE processing circuitry 130 may apply the received signal strengths to a signal strength threshold to determine the candidate roaming access nodes. UE processing circuitry 130 determines performance differentials between home access node 140 and the candidate roaming access nodes based on the performance information. For example, UE processing circuitry 130 may determine the difference in network throughput between the candidate roaming access nodes and home access node 140. UE processing circuitry 130 ranks the candidate roaming access nodes by performance differential (207). When at least one of the performance differentials exceeds a performance differential threshold, UE processing circuitry 130 generates a handover request to attach to the candidate roaming access node with the largest performance differential and transfers the handover request to UE radio 120 (208). UE radio 120 wirelessly transfers the handover request to home access node 140 (209).

Figure 3:
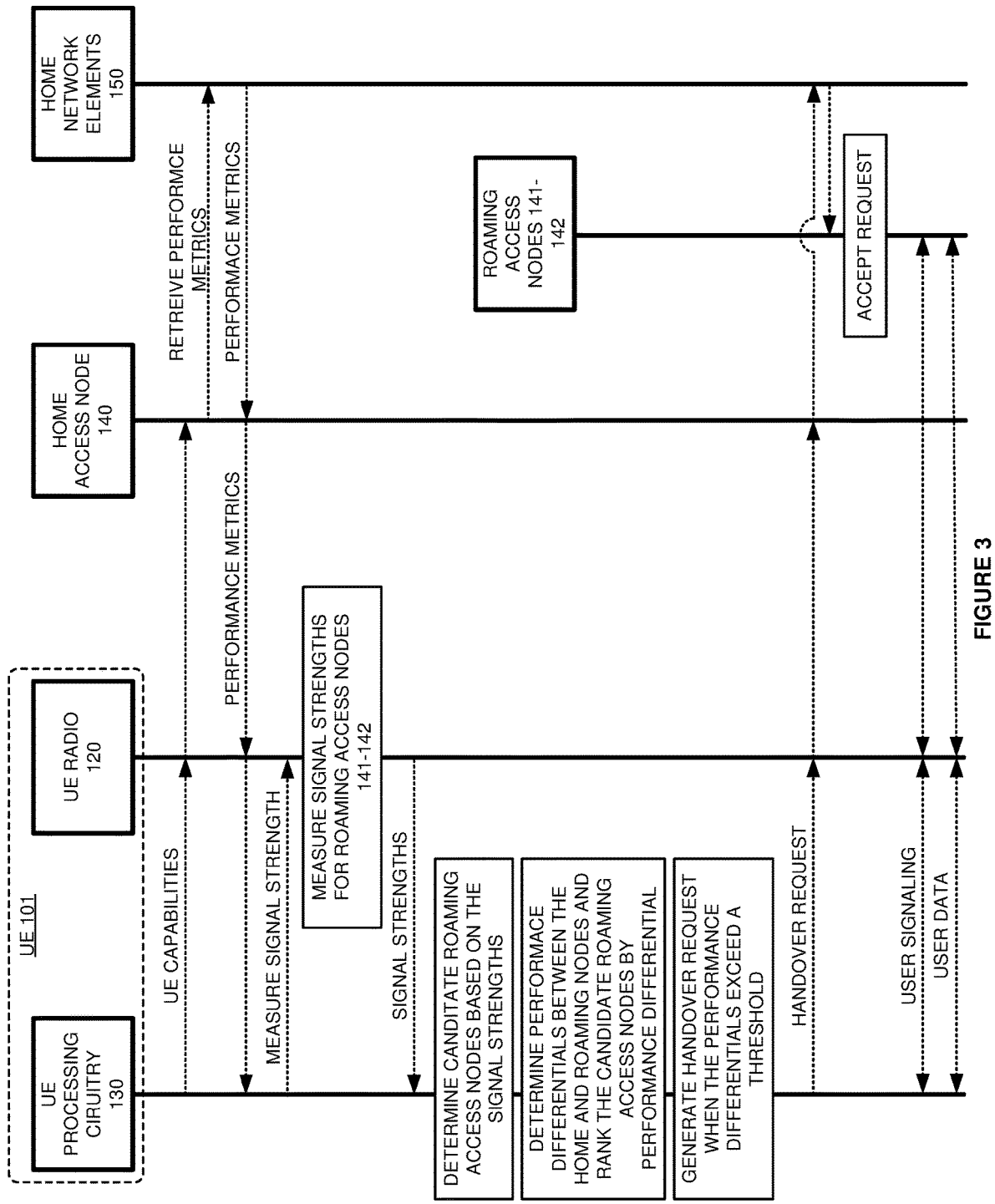
FIG. 3 illustrates an exemplary operation of the wireless UE to hand over to a roaming wireless network based on network performance.

FIG. 3 illustrates an exemplary operation of UE 101 to hand over to a roaming access node based on network performance. In other examples, the operation and structure of UE 101 may differ. In this example, UE 101 hands over to a roaming access node based on network performance differentials between a home access node and roaming access nodes.

In operation, UE processing circuitry 130 transfers UE capabilities for UE 101 to UE radio 120. UE radio 120 wirelessly transfers the UE capabilities to home access node 140. In response to receiving the UE capabilities for UE 101, home access node 140 retrieves performance information for roaming access nodes 141-142 from home network elements 150. Home access node 140 wirelessly transfers the performance information for the roaming access nodes and performance information for itself to UE processing circuitry 130 over UE radio 120. For example, the performance metrics may indicate network throughput, network error rate, or some other performance indicator for roaming access nodes 141-142 and home access node 140. UE processing circuitry 130 directs UE radio 120 to measure the signal strength for roaming access nodes 141-142. UE radio 120 measures the signal strengths for roaming access nodes 141-142 and transfers the signal strengths to UE processing circuitry 130.

UE processing circuitry determines candidate roaming access nodes out of roaming access nodes 141-142 based on the signal strengths. For example, processing circuitry 130 may determine the received signal strength for roaming access node 142 is sufficient for data services and responsively determine that roaming access node 142 is a candidate roaming access node. Likewise, processing circuitry 130 may determine that the signal strength for roaming access node 141 is insufficient for wireless data services and responsively determine that roaming access node 141 is not a candidate roaming access node. When UE processing circuitry 130 determines that a roaming access node is not a candidate roaming access node, UE processing circuitry 130 does not attempt to attach to that roaming access node. UE processing circuitry 130 determines performance differentials between home access node 140 and the candidate roaming access nodes of roaming access nodes 141-142. The performance differentials may indicate differences in network throughput, network error rate, or some other network performance indicator between home access node 140 and the candidate roaming access nodes of roaming access nodes 141-142. UE processing circuitry 130 ranks the candidate roaming access nodes by performance differential. Typically, UE processing circuitry 130 ranks candidate roaming access nodes with larger performance differentials higher than candidate roaming access nodes with smaller performance differentials.

UE processing circuitry 130 generates a handover request to attach to the roaming access node with the largest performance differential when the performance differentials exceed a performance differential threshold. In some examples, UE processing circuitry 130 determines that a Guaranteed Bit Rate (GBR) application is active on UE 101 and may responsively generate a handover request when the performance differential threshold is exceeded and the GBR application is active. In some examples, UE processing circuitry 130 determines that a UE hotspot capability is active on UE 101 and may responsively generate a handover request when the performance differential threshold is exceeded, and the UE hotspot capability is active. In some examples, UE processing circuitry 130 determines the antenna type of the candidate roaming access nodes and the antenna type of UE radio 120 and responsively generates a handover request when the performance differential threshold is exceeded, and the antenna types are the same. UE processing circuitry 130 transfers the handover request to home access node 140 over UE radio 120. Home access node forwards the handover request to roaming access nodes 141-142 over home network elements 150. Home network elements 150 typically transfers the handover request to roaming access nodes 141-142 over roaming network elements 151-152 however roaming network elements 151-152 are omitted for clarity. The selected candidate roaming access node of roaming access nodes 141-142 accepts the handover request. UE processing circuitry 130 exchanges user signaling over UE radio 120 with the selected candidate roaming access node to attach to the candidate roaming access node. UE processing circuitry 130 exchanges user data with the selected roaming access node.

Figure 4:
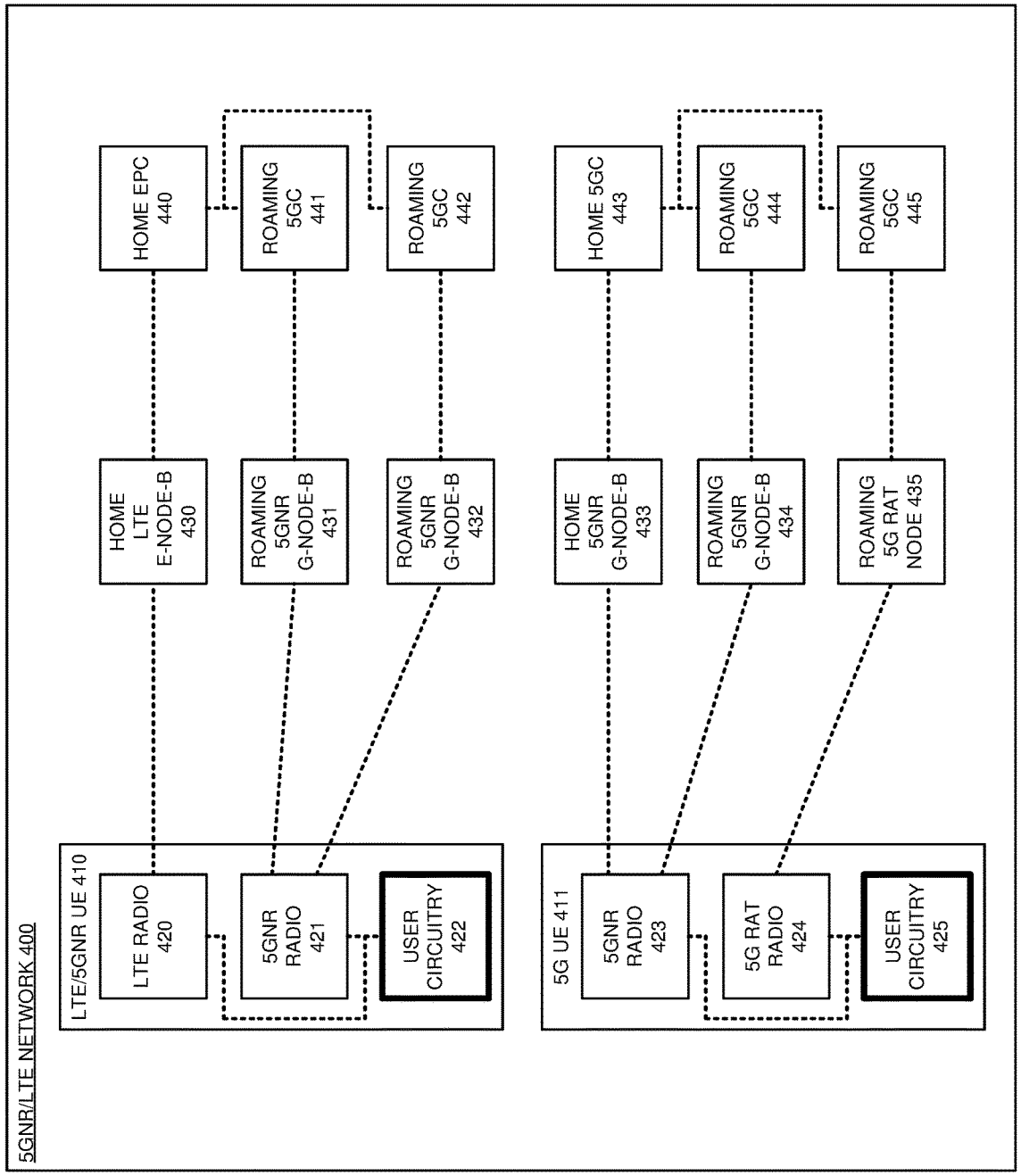
FIG. 4 illustrates a Fifth Generation New Radio (5GNR)/Long Term Evolution (LTE) UE and a Fifth Generation (5G) UE to hand over to a roaming wireless network based on network performance.

FIG. 4 illustrates Fifth Generation New Radio (5GNR) Long Term Evolution (LTE) networks 400 to hand over UEs 410 based on network performance differences. 5GNR/LTE networks 400 are an example of wireless communication networks 100, although networks 100 may differ. 5GNR/LTE networks 400 comprise 5GNR/LTE UE 410, 5G UE 411, home LTE eNodeB 430, roaming 5GNR gNodeBs 431-432, home 5GNR gNodeB 433, roaming 5GNR gNodeB 4235, roaming 5G RAT node 435, home Evolved Packet Core (EPC) 440, roaming Fifth Generation Cores (5GCs) 441-442, home 5GC 443, and roaming 5GCs 444-445. LTE/5GNR UE 410 comprises LTE radio 420, 5GNR radio 421, and user circuitry 422. 5G UE 411 comprises 5GNR radio 423, 5G RAT radio 424, and user circuitry 425.

EPC 440 and 5GCs 441-445 comprise Network Function Virtualization Infrastructure (NFVI) hardware, NFVI hardware drivers, NFVI operating systems, NFVI virtual layers, and NFVI Virtual Network Functions (VNFs), however individual structures depicting the NFVI systems of EPC 440 and the NFVI systems of 5GCs 441-445 are omitted for clarity. The NFVI hardware typically comprises Network Interface Cards (NIC), CPU, RAM, flash/disk drives, and data switches (SW). The NFVI hardware drivers typically comprise software that is resident in the NIC, CPU, RAM, DRIVE, and SW. The NFVI operating systems typically comprise kernels, modules, applications, containers, hypervisors, and the like. The NFVI virtual layers comprises virtual NICs (vNIC), virtual CPUs (vCPU), virtual RAM (vRAM), virtual Drives (vDRIVE), and virtual Switches (vSW). The NFVI VNFs typically comprise LTE MME, LTE SAE GW, LTE PCRF, LTE HSS, 5GC AMF, 5GC UPF, 5GC SMF, 5GC AUSF, 5GC PCF, 5GC UDM and/or other LTE and 5GC VNFs. The NFVI hardware in EPC 440 and 5GCs 441-445 executes the NFVI hardware drivers, the NFVI operating systems, the NFVI virtual layers, and the NFVI VNFs to serve UEs 410-411.

In operation, UE 410 attaches to home LTE eNodeB 430 over LTE radio 420. User circuitry 422 transfers UE capabilities of UE 410 to home LTE eNodeB 430 over LTE radio 420. The UE capabilities indicate Public Land Mobile Networks (PLMNs) that UE 410 can attach to. Home LTE eNodeB 430 requests data service for UE 410 from home EPC 440 over S1-MME signaling and indicates the UE capabilities of UE 410. Home EPC 440 authenticates and authorizes LTE/5GNR UE 410 for wireless data services that are represented by Access Point Names (APNs). Home EPC 440 selects Access Point Names (APNs), Quality-of-Service Class Identifiers (QCIs), and network addresses for UE 410 based on the APNs. In response to the UE capabilities, home LTE EPC 440 retrieves network performance information for the PLMNs indicated in the UE capabilities from roaming 5GCs 441-442. Home LTE EPC 440 transfers the APNs, QCIs, network address, and performance information for UE 410 to home LTE eNodeB 430. Home EPC 440 exchanges user data for UE 410 with external systems and with Home LTE eNodeB 430. Home LTE eNodeB 430 transfers the APNs, QCIs, network address to user circuitry 422 over LTE radio 420. Home LTE eNodeB 430 exchanges the user data with user circuitry 422 over LTE radio 420.

User circuitry 422 directs 5GNR radio 421 to measure signal strengths for roaming 5GNR gNodeBs 431-432. 5GNR radio 421 transfers the signal strengths for roaming 5GNR gNodeBs 431-432 to user circuitry 422. User circuitry 422 determines candidate roaming access nodes based on the signal strengths of roaming 5GNR gNodeBs 431-432. Typically, user circuitry 422 selects roaming access nodes with received signal strength capable of supported wireless data services as candidate roaming access nodes. User circuitry 422 determines network performance differentials between home LTE eNodeB 430 and roaming 5GNR gNodeBs 431-432. For example, the network performance differentials may indicate differences between home LTE eNodeB 430 and roaming 5GNR gNodeBs 431-432 in network error rate, throughput, band fading, intermodulation, interference, and/or other network performance indicators. User circuitry 422 ranks the candidate roaming access nodes based on network performance differential. Typically, user circuitry 422 ranks candidate roaming access nodes with a larger performance differential higher than candidate roaming access nodes with a smaller performance differential.

When at least one of the network performance differentials exceed a performance differential threshold, user circuitry 422 generates a handover request to attach to the candidate roaming access node with the largest performance differential. In some examples, user circuitry 422 may generate a handover request in response to other triggering events in addition to the exceeded performance differential threshold. For example, user circuitry 422 may determine that a Guaranteed Bit Rate (GBR) application is active, a UE WiFi hotspot capability is active, and/or other triggering events are active and responsively generate a handover request when the performance differentials exceed a performance differential threshold.

User circuitry 422 transfers the handover request to attach to the selected candidate roaming access node to home LTE eNodeB 430 over LTE radio 420. Home LTE eNodeB 430 transfers the handover request to home EPC 440. Home EPC 440 routes the handover request to the roaming 5GC associated with the selected candidate roaming access node. For example, if the handover request indicates the selected candidate roaming access node is roaming 5GNR gNodeB 431, then home EPC 440 routes the handover request to roaming 5GC 441. The selected roaming 5GC accepts the request. Home EPC 440 directs home LTE eNodeB 430 to notify user circuitry 422. Home LTE eNodeB 430 transfers a notification to LTE radio 420 that indicates that the handover request has been accepted. LTE radio 420 transfers the notification to user circuitry 422.

User circuitry 422 directs LTE radio 420 to detach from home LTE eNodeB 430 and directs 5GNR radio 421 to attach to the selected candidate roaming access node of roaming access nodes 431-432. User circuitry 422 exchanges attachment signaling with the selected candidate roaming access node over 5GNR radio 421. User circuitry 422 exchanges user data with the selected candidate roaming access node over 5GNR radio 421.

In some examples, user circuitry 422 stores a PLMN list of PLMNs that UE 410 can attach to and receive wireless communications service. The PLMN list may indicate network performance information for each of the PLMNs and the access nodes associated with the PLMNs. For example, the performance information may indicate network throughput, network error rate, band fading, interference level, and/or other performance information associated with the PLMNs. The PLMN list may further indicate performance differential thresholds for each of the available PLMNs. User circuitry 422 updates the performance information in the PLMN list when user circuitry 422 receives new PLMN data. User circuitry 422 may receive new PLMN data over System Information Blocks (SIBs) broadcast by home LTE eNodeB 430 and roaming 5GNR gNodeBs 431-432. User circuitry 422 may determine new PLMN data when UE 410 is attached to one of the PLMNs. For example, user circuitry 422 may measure network throughput for home LTE eNodeB 430 and store the network throughput for the PLMN of LTE eNodeB 430 in the PLMN list. User circuitry 422 may utilize the stored performance information from the PLMN list to determine the network performance differentials. For example, home LTE eNodeB 430 may not be able to provide network performance information for each of the available PLMNs and user circuitry 422 may instead use the PLMN list to determine the performance information. In some examples, user circuitry 422 comprises a Subscriber Identity Module (SIM) and the SIM of user circuitry 422 stores the PLMN list.

Note 5GNR gNodeBs 433-434 and 5G RAT node 435 use different types of 5G Radio Access Technology (RAT). The different types of 5G RAT may have different frequency channel sizes, frequency levels, resource block time intervals, and resource block bandwidths. For example, home 5GNR gNodeB 433 may provide an enhanced voice calling service with unique time intervals and bandwidths while roaming 5G RAT node 435 may provide an enhanced video broadcast service with unique time intervals and bandwidths while. Some 5G UEs are not capable of using each type of 5G technology from 5GNR gNodeB 433-434 and 5G RAT node 435, but 5G UE 411 is capable of using each type of 5G RAT.

User circuitry 425 in 5G UE 411 directs 5GNR radio 423 to attach to home 5GNR gNodeB 433 and to indicate the UE capabilities of 5G UE 411. The UE capabilities indicate PLMNs that 5G UE 411 can use for wireless data services. 5GRN radio 423 wirelessly attaches to home 5GNR gNodeB 433 and indicates the UE capabilities of 5G UE 411. Home 5GNR gNodeB 433 requests data service from 5GC 443 and indicates the capabilities of UE 411 to 5GC 443 over N2 signaling. Home 5GC 443 authenticates and authorizes 5G UE 411 for data services. In response to the UE capabilities, home 5GC 443 retrieves network performance information for the PLMNs indicated in the UE capabilities from roaming 5GCs 444-445. Home 5GC 443 transfers quality-of-service metrics and network addressing for UE 411 and network performance information of roaming 5GCs 444-445 and home 5GC 443 to home 5GNR gNodeB 433. home 5GNR gNodeB 433 transfers the selected quality-of-service metrics, network addresses, and network performance information to user circuitry 425 or 5GNR radio 423. Home 5GNR gNodeB 433 wirelessly exchanges user data with user circuitry 425 over 5GNR radio 423.

User circuitry 425 directs 5GNR radio 423 to measure signal strength for roaming 5GNR gNodeB 434 and directs 5G RAT radio 424 to measure signal strength for roaming 5G RAT node 435. 5GNR radio 423 and 5G RAT radio 424 transfer the signal strengths for to user circuitry 425. User circuitry 425 determines candidate roaming access nodes from roaming 5GNR gNodeB 434 and 5G RAT node 435 based on the signal strengths. Typically, user circuitry 425 selects roaming access nodes that have a received signal strength strong enough to support wireless data services as candidate roaming access nodes. User circuitry 425 determines a network performance differential between home 5GNR gNodeB 433 and roaming 5GNR gNodeB 434 and a network performance differential between 5GNR gNodeB 433 and roaming 5G RAT node 435. For example, the network performance differentials may indicate differences between home 5GNR gNodeB 433 and roaming nodes 434-435 in network error rate, throughput, band fading, intermodulation, interference, and/or other network performance indicators. User circuitry 425 ranks the candidate roaming access nodes by network performance differential. Typically, user circuitry 425 ranks candidate roaming access nodes with a larger performance differential high than candidate roaming access nodes with a smaller performance differential.

When at least one of the network performance differentials exceed a performance differential threshold, user circuitry 425 generates a handover request to attach to the candidate roaming access node with the largest performance differential. In some examples, user circuitry 425 may generate a handover request in response to other triggering events in addition to the exceeded performance differential threshold. For example, user circuitry 425 may determine that a GBR application is active, a UE WiFi hotspot capability is active, and/or other triggering events are active and responsively generate a handover request when the performance differentials exceed a performance differential threshold.

User circuitry 425 transfers the handover request to attach to the selected candidate roaming access node to home 5GNR gNodeB 433 over 5GNR radio 423. Home 5GNR gNodeB 433 transfers the handover request to home 5GC 443. Home 5GC 443 routes the handover request to the roaming 5GC associated with the selected candidate roaming access node. For example, if the handover request indicates the selected candidate roaming access node is roaming 5G RAT node 435, then home 5GC 443 routes the handover request to roaming 5GC 445. The selected roaming 5GC accepts the request. Home 5GC 443 directs home 5GNR gNodeB 433 to notify user circuitry 425. Home 5GNR gNodeB 433 transfers a notification to 5GNR radio 423 that indicates that the handover request has been accepted. 5GNR radio 423 transfers the notification to user circuitry 425.

User circuitry 425 directs 5GNR radio 423 to detach from home 5GNR gNodeB 433 and directs 5GNR radio 423 or 5G RAT radio 424 to attach to the selected candidate roaming access node of roaming access nodes 431-432. User circuitry 425 exchanges attachment signaling with the selected candidate roaming access node over radio. User circuitry 425 exchanges user data with the selected candidate roaming access node over the radio.

In some examples, user circuitry 425 stores a PLMN list of PLMNs that 5G UE 411 can attach to and receive wireless communications service. The PLMN list may indicate network performance information for each of the PLMNs and the access nodes associated with the PLMNs. For example, the performance information may indicate network throughput, network error rate, band fading, interference level, and/or other performance information associated with the PLMNs. The PLMN list may further indicate performance differential thresholds for each of the available PLMNs. User circuitry 425 updates the performance information in the PLMN list when user circuitry 425 receives new PLMN data. User circuitry 425 may receive new PLMN data over System Information Blocks (SIBs) broadcast by home 5GNR gNodeB 433, roaming 5GNR gNodeBs 434, and roaming 5G RAT node 435. User circuitry 425 may determine new PLMN data when UE 411 is attached to one of the PLMNs. For example, user circuitry 425 may measure network throughput for home 5GNR gNodeB 433 and store the network throughput for the PLMN of home 5GNR gNodeB 433 in the PLMN list. User circuitry 425 may utilize the stored performance information from the PLMN list to determine the network performance differentials. For example, home 5GNR eNodeB 433 may not be able to provide network performance information for each of the available PLMNs and user circuitry 425 may instead use the PLMN list to determine the performance information. In some examples, user circuitry 425 comprises a Subscriber Identity Module (SIM) and the SIM of user circuitry 425 stores the PLMN list.

Advantageously, 5GNR/LTE UE 410 generates a handover request to attach to a roaming access node in response to a performance differential between the home and roaming access nodes. Moreover, 5G UE 411 generates a handover request to attach to a roaming access node in response to a performance differential between the home and roaming access node.

Figure 5:
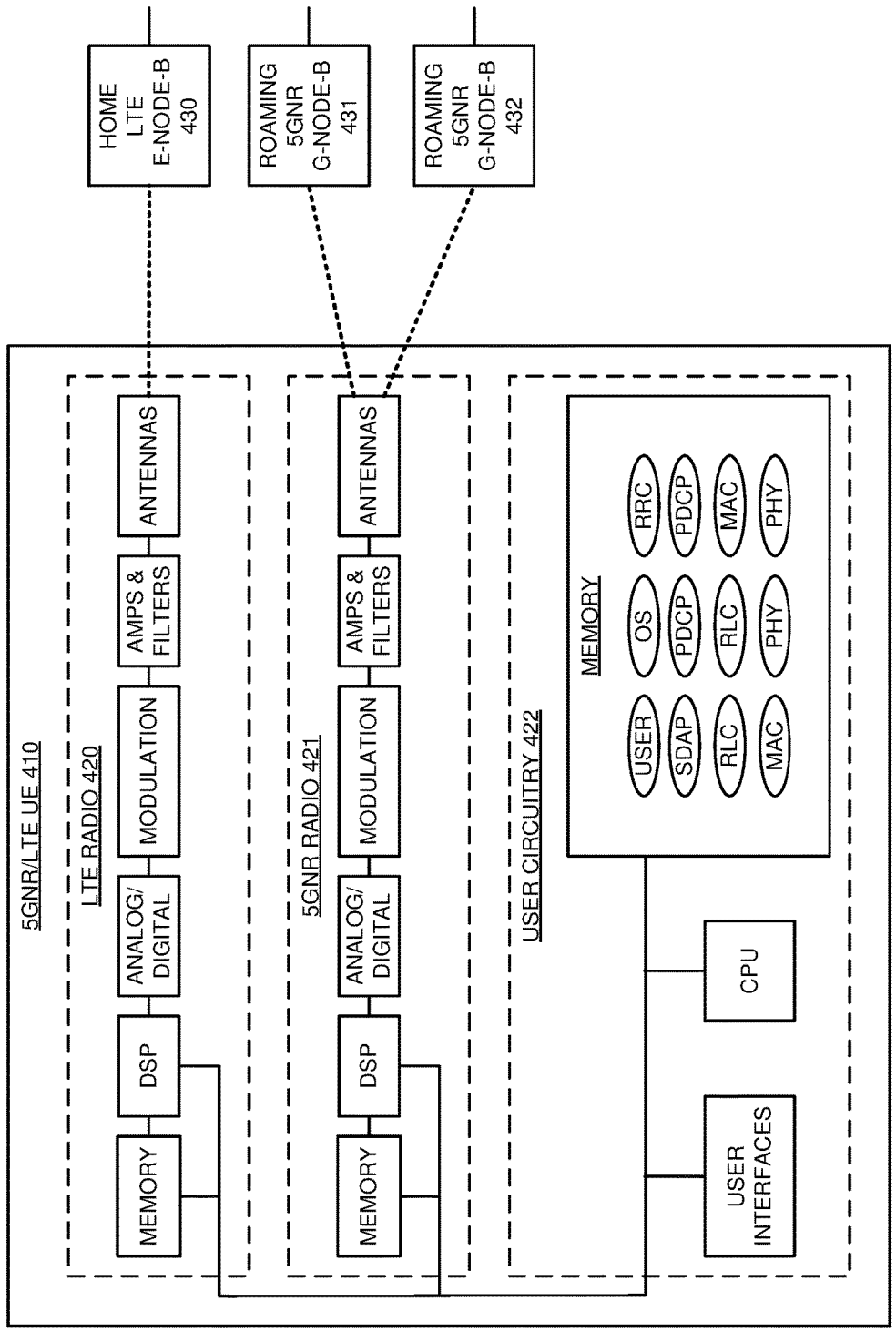
FIG. 5 illustrates the 5GNR/LTE UE to hand over to a roaming wireless network based on network performance.

FIG. 5 illustrates 5GNR/LTE UE 410 that generates a handover request based on network performance differentials. 5GNR/LTE UE 410 is an example of UE 101, although UE 101 may differ. UE 410 comprises LTE radio 420, 5GNR radio 421, and user circuitry 422 that are coupled over bus circuitry. Radios 420-421 comprise antennas, amplifiers, filters, modulation, analog-to-digital interfaces, DSP, and memory that are coupled over bus circuitry. User circuitry 422 comprises user interfaces, CPU, and memory that are coupled over bus circuitry.

The antennas in radios 420 and 421 are wirelessly coupled to home LTE eNodeB 430, roaming 5GNR gNodeB 431, and roaming 5GNR gNodeB 432. The user interfaces in user circuitry 422 comprise graphic displays, machine controllers, sensors, cameras, transceivers, and/or some other user components. The memory in user circuitry 422 stores an operating system, user applications (USER), and network applications like Radio Resource Control (RRC), Service Data Adaptation Protocol (SDAP), Packet Data Convergence Protocol (PDCP), Radio Link Control (RLC), Media Access Control (MAC), and Physical Layer (PHY). The CPU in user circuitry 422 executes the operating system and the user applications to generate and consume user data. The CPU in user circuitry 422 executes the operating system and the network applications to wirelessly exchange corresponding signaling and data with home LTE eNodeB 430, roaming 5GNR gNodeB 431, and roaming 5GNR gNodeB 432.

In operation, the LTE RRC in 5GNR/LTE UE 410 wirelessly attaches to home LTE eNodeB 430 over antennas in LTE radio 420. The LTE RRC in UE 410 generates UL LTE signaling and UL LTE data. The UL signaling indicates UE capabilities for different PLMNs of UE 410. The LTE network applications in UE 410 process the UL LTE signaling and the UL LTE data to generate corresponding UL LTE symbols that carry the UL LTE signaling and UL LTE data. The LTE DSP in LTE radio 420 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the UE capabilities for the different PLMNs) and UL LTE data for UE 410 to LTE eNodeB 430.

The LTE antennas in LTE radio 420 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates performance metrics for home LTE eNodeB 430, roaming 5GNR gNodeB 431, and roaming 5GNR gNodeB 432, APNs, QCIs, and network addresses from Home LTE eNodeB 430.

The LTE RRC in user circuitry 422 drives the 5GNR RRC to direct the 5GNR PHY to measure signal strengths for roaming 5GNR gNodeBs 431-432. The 5GNR PHY measures the signal strength for roaming 5GNR gNodeBs 431 and the signal strength for roaming 5GNR gNodeB 432. The 5GNR PHY transfers the received signal strengths for roaming 5GNR gNodeBs 431-432 to the LTE RRC. The LTE RRC determines candidate roaming access nodes based on the received signal strengths of roaming 5GNR gNodeBs 431-432. For example, the LTE RRC may implement a data structure to compare the received signal strengths to a signal strength threshold to determine if roaming 5GNR gNodeBs 431-432 comprise candidate roaming access nodes. The LTE RRC determines network performance differentials between home LTE eNodeB 430 and roaming 5GNR gNodeBs 431-432. The network performance differentials indicate differences in performance between home LTE eNodeB 430 and roaming 5GNR gNodeBs 431-432. The network performance differentials may indicate differences in network error rate, throughput, band fading, intermodulation, interference, and/or other network performance indicators. For example, the LTE RRC may determine the network throughput for home LTE eNodeB 430, the network throughput for roaming 5GNR gNodeB 431, and the difference in network throughput between home LTE eNodeB 430 and roaming 5GNR gNodeB 431 to determine the network performance differential for roaming 5GNR gNodeB 431. The LTE RRC ranks the candidate roaming access nodes by network performance differential. The LTE RRC ranks candidate roaming access nodes with a larger performance differential higher than candidate roaming access nodes with a smaller performance differential.

The LTE RRC determines a performance differential threshold for the candidate roaming access nodes. In some examples, the LTE RRC determines individual performance differential thresholds for each candidate roaming access nodes. When at least one of the network performance differentials exceed the performance differential threshold, the LTE RRC generates a handover request to attach to the candidate roaming access node with the largest performance differential. In some examples, the LTE RRC may generate a handover request in response to other triggering events in addition to the exceeded performance differential threshold. The triggering events may comprise a GBR application, a UE WiFi hotspot, premium UE user application, or some other type of triggering event. For example, the LTE RRC may determine that a GBR application is active and responsively generate a handover request when the performance differentials exceed the performance differential threshold and the GBR application is active.

The LTE RRC directs the LTE PHY to transfer the handover request to home LTE eNodeB 430 over LTE radio 420 to attach to the selected candidate roaming access node. The LTE RRC receives indication from home LTE eNodeB 430 that handover request has been accepted. The LTE RRC detaches from home LTE eNodeB 430 and directs the 5GNR RRC to attach to attach to the selected candidate roaming access node of roaming access nodes 431-432. The 5GNR RRC exchanges attachment signaling with the selected candidate roaming access node over 5GNR radio 421. The 5GNR RRC attaches to the selected candidate roaming access node. The 5GNR PDCP exchanges user data with the selected candidate roaming access node over 5GNR radio 421.

In some examples, user circuitry 422 stores a PLMN list of PLMNs that UE 410 can attach to and receive wireless communications service. The PLMN list may indicate network performance information for each of the PLMNs and the access nodes associated with the PLMNs. For example, the performance information may indicate network throughput, network error rate, band fading, interference level, and/or other performance information associated with the PLMNs. The PLMN list may further indicate performance differential thresholds for each of the available PLMNs. The LTE RRC updates the performance information in the PLMN list when the LTE RRC receives new PLMN data. The LTE RRC may receive new PLMN data over System Information Blocks (SIBs) broadcast by home LTE eNodeB 430 and the 5GNR RRC may receive new PLMN data over SIBs broadcast by roaming 5GNR gNodeBs 431-432. The RRCs may determine new PLMN data when UE 410 is attached to one of the PLMNs. For example, the LTE RRC may measure network throughput for home LTE eNodeB 430 and store the network throughput for the PLMN of LTE eNodeB 430 in the PLMN list. The RRCs may utilize the stored performance information from the PLMN list to determine the network performance differentials. For example, home LTE eNodeB 430 may not be able to provide network performance information for each of the available PLMNs and LTE RRC may instead retrieve the performance information from the PLMN list. In some examples, user circuitry 422 comprises a Subscriber Identity Module (SIM) and the SIM of user circuitry 422 stores the PLMN list.

Figure 6:
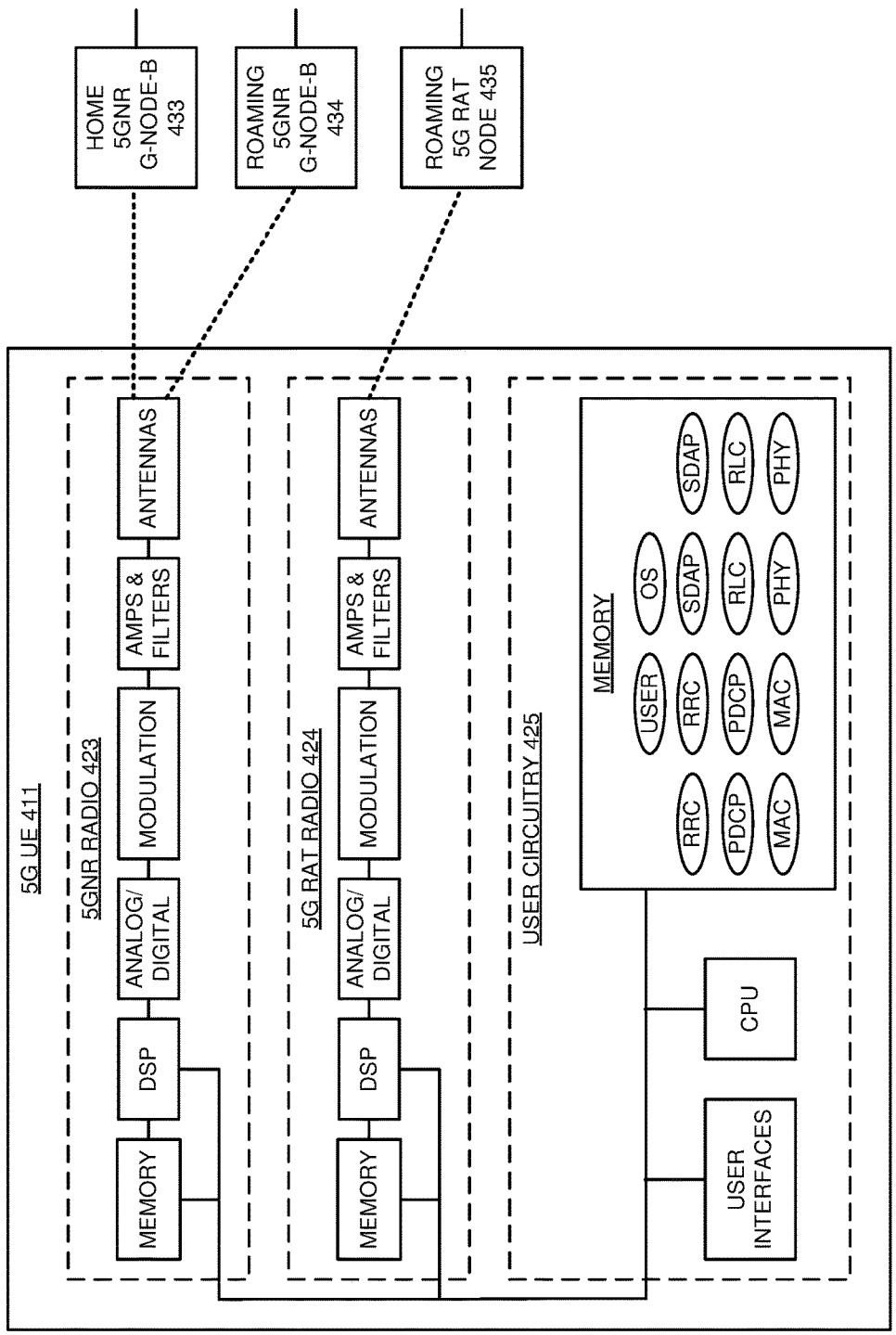
FIG. 6 illustrates the 5G UE to hand over to a roaming wireless network based on network performance.

FIG. 6 illustrates 5G UE 411 that generates a handover request based on network performance differentials. 5G UE 411 is an example of UE 101, although UE 101 may differ. UE 411 comprises 5GNR radio 423, 5GNR RAT radio 424, and user circuitry 425 that are coupled over bus circuitry. Radios 423-424 comprise antennas, amplifiers, filters, modulation, analog-to-digital interfaces, DSP, and memory that are coupled over bus circuitry. User circuitry 425 comprises user interfaces, CPU, and memory that are coupled over bus circuitry. The antennas in 5GNR radio 423 are wirelessly coupled to home 5GNR gNodeB 433 and roaming 5GNR gNodeB 434. The antennas in 5GNR RAT radio 424 are wirelessly coupled to roaming 5G RAT node 435. The user interfaces in user circuitry 425 comprise graphic displays, machine controllers, sensors, cameras, transceivers, and/or some other user components. The memory in user circuitry 425 stores an operating system (OS), user applications (USER), and network applications (RRC, SDAP, PDCP, RLC, MAC, and PHY). The CPU in user circuitry 425 executes the operating system and the user applications to generate and consume user data. The CPU in user circuitry 425 executes the operating system and the network applications to wirelessly exchange corresponding signaling and data with home 5GNR gNodeB 433 and roaming 5GNR gNodeB 434 over 5GNR radio 423, with roaming 5G RAT node 435 over 5G RAT radio 424.

In operation, the 5GNR RRC in UE 411 wirelessly attaches to home 5GNR gNodeB 433 over antennas in 5GNR radio 423. The 5GNR RRC generates 5GNR signals that transport UL 5GNR signaling and UL 5GNR data. The 5GNR signaling indicates UE capabilities for different PLMNs. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 423 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the UE capabilities for the different PLMNs) and UL 5GNR data for UE 411 to home 5GNR gNodeB 433.

The 5GNR antennas 5GNR radio 423 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling having the network performance information for home 5GNR gNodeB 433, roaming 5GNR gNodeB 434, and roaming 5G RAT node 435, QoS levels, network addresses, and the like and the DL 5GNR data.

The 5GNR RRC directs the 5GNR PHY to measure signal strength for roaming 5GNR gNodeB 434. The 5GNR RRC directs the 5G RAT RRC to drive the 5G RAT PHY to measure signal strength for roaming 5G RAT node 435. The 5GNR PHY and the 5G RAT PHY measure the signal strengths and transfer the signal strengths to the 5GNR RRC. The 5GNR RRC determines candidate roaming access nodes from roaming 5GNR gNodeB 434 and 5G RAT node 435 based on the signal strengths. For example, the 5GNR RRC may implement a data structure to compare the received signal strengths to a signal strength threshold to determine if roaming access nodes 434-435 comprise candidate roaming access nodes. The 5GNR RRC determines a network performance differential between home 5GNR gNodeB 433 and roaming 5GNR gNodeB 434 and a network performance differential between home 5GNR gNodeB 433 and roaming 5G RAT node 435. The network performance differentials indicate differences in performance between home 5GNR gNodeB 433 and roaming nodes 434-435. The network performance differentials may indicate differences in network error rate, throughput, band fading, intermodulation, interference, and/or other network performance indicators. For example, the 5GNR RRC may determine the network throughput for home 5GNR gNodeB 433, the network throughput for roaming 5G RAT node 435, and the difference in network throughput between home 5GNR gNodeB 433 and roaming 5G RAT node 435 to determine the network performance differential for roaming 5G node 435. The 5GNR RRC ranks the candidate roaming access nodes by network performance differential. Typically, the 5GNR RRC ranks the candidate roaming access nodes with a larger performance differential high than candidate roaming access nodes with a smaller performance differential.

The 5GNR RRC determines a network performance differential threshold for the candidate roaming access nodes. In some examples, the 5GNR RRC determines individual performance differential thresholds for each of the candidate roaming access nodes. When at least one of the network performance differentials exceed the performance differential threshold, the 5GNR RRC generates a handover request to attach to the candidate roaming access node with the largest performance differential. In some examples, the 5GNR RRC may generate a handover request in response to other triggering events in addition to the exceeded performance differential threshold. The triggering events may comprise a GBR application, a UE WiFi hotspot, a premium UE user application, or some other type of triggering event. For example, the LTE RRC may determine that a UE WiFi hotspot is active and responsively generate a handover request when the performance differentials exceed the performance differential threshold, and the UE WiFi hotspot is active.

The 5GNR RRC transfers the handover request to attach to the selected candidate roaming access node to home 5GNR gNodeB 433. The 5GNR RRC receives a notification that the handover request is accepted from home 5GNR gNodeB 423. The 5GNR RRC detaches from home 5GNR gNodeB 433. The 5GNR RRC attaches to the selected candidate roaming access node of roaming access nodes 434-435. In some examples, the 5GNR RRC drives the 5G RAT RRC to attach when the selected candidate roaming access node is roaming 5G RAT node 435. The corresponding RRCs in UE 411 exchange attachment signaling with the selected candidate roaming access node over radio. The corresponding SDAPs exchange user data with the selected candidate roaming access node over the corresponding radios.

In some examples, user circuitry 425 stores a PLMN list of PLMNs that UE 411 can attach to and receive wireless communications service. The PLMN list may indicate network performance information for each of the PLMNs and the access nodes associated with the PLMNs. For example, the performance information may indicate network throughput, network error rate, band fading, interference level, and/or other performance information associated with the PLMNs. The PLMN list may further indicate performance differential thresholds for each of the available PLMNs. The 5GNR RRC updates the performance information in the PLMN list when the 5GNR RRC receives new PLMN data. The 5GNR RRC may receive new PLMN data over SIBs broadcast by home 5GNR gNodeB 433 and roaming 5NGR gNodeB 434 and the 5G RAT RRC may receive new PLMN data over SIBs broadcast by roaming 5G RAT node 435. The RRCs may determine new PLMN data when UE 411 is attached to one of the PLMNs. For example, the 5GNR RRC may measure network throughput for home 5GNR gNodeB 433 and store the network throughput for the PLMN of 5GNR gNodeB 433 in the PLMN list. The RRCs may utilize the stored performance information from the PLMN list to determine the network performance differentials. For example, home 5GNR gNodeB 433 may not be able to provide network performance information for each of the available PLMNs and LTE RRC may instead retrieve the performance information from the PLMN list. In some examples, user circuitry 425 comprises a Subscriber Identity Module (SIM) and the SIM of user circuitry 425 stores the PLMN list.

Figure 7:
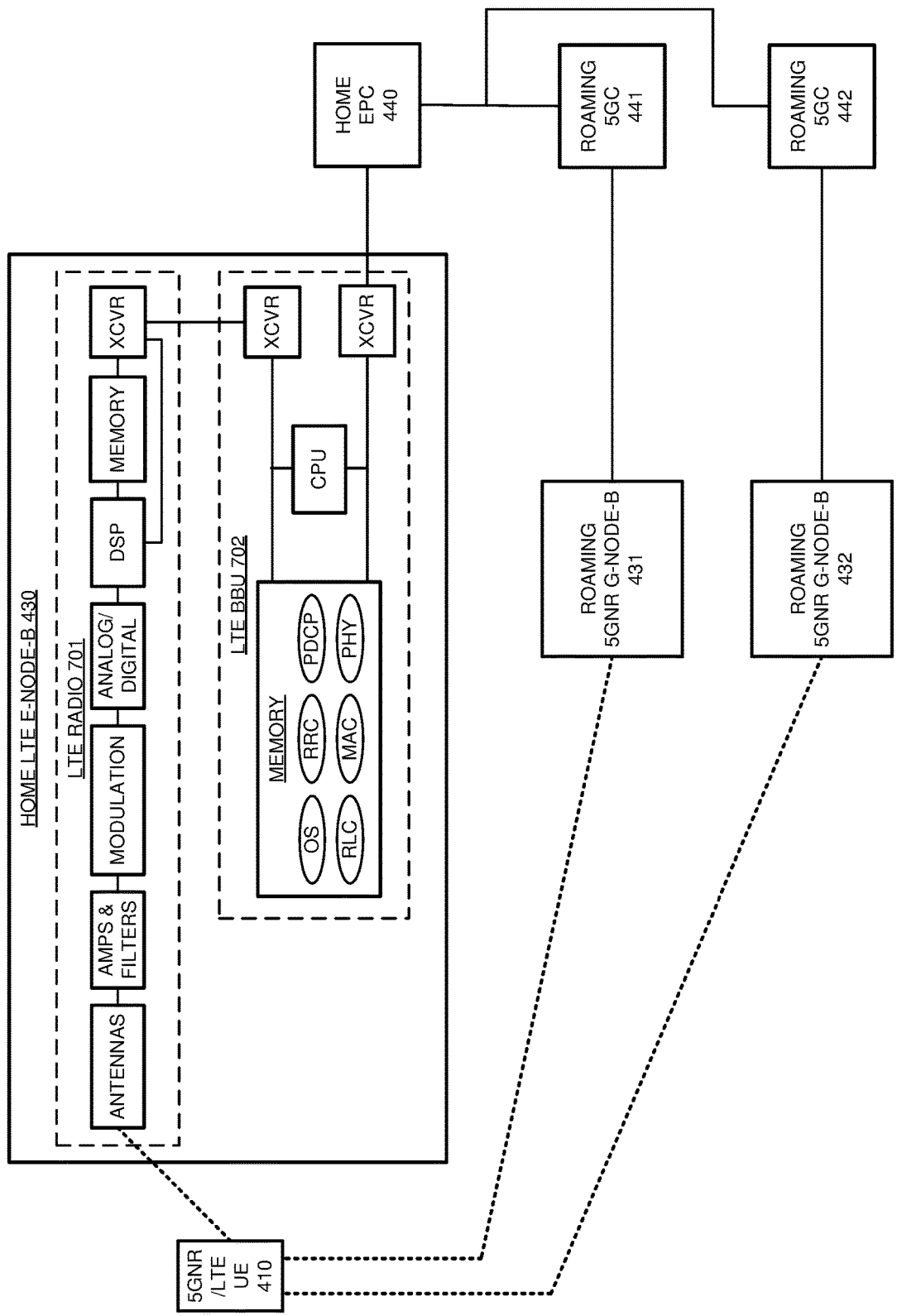
FIG. 7 illustrates a home LTE eNodeB to facilitate the handover of the 5GNR/LTE UE.

FIG. 7 illustrates home LTE eNodeB 430 to hand over wireless UE 410 based network performance. Home LTE eNodeB 430 is an example of home access node 140, although home access node 140 may differ. Home LTE eNodeB 430 comprises LTE radio 701 and LTE Baseband Unit (BBU) 702. Radio 701 comprises antennas, amplifiers, filters, modulation, analog-to-digital interfaces, DSP, memory, and transceivers (XCVR) that are coupled over bus circuitry. LTE BBU 702 comprises memory, CPU, and transceivers that are coupled over bus circuitry. The memory in LTE BBU 702 stores operating systems (OS) and network applications like Physical Layer (PHY), Media Access Control (MAC), Radio Link Control (RLC), Packet Data Convergence Protocol (PDCP), and Radio Resource Control (RRC). The CPU in LTE BBU 702 executes the operating systems, PHYs, MACs, RLCs, PDCPs, and RRCs to exchange network signaling and user data between UE 410 and home EPC 440. UE 410 is wirelessly coupled to the antennas in LTE radio 701 over an LTE link. The transceiver in LTE radio 701 is coupled to a transceiver in LTE BBU 702 over Common Public Radio Interface (CPRI) links. A transceiver in LTE BBU 702 is coupled to home EPC 440 over backhaul links.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, UE 410 wirelessly attaches to LTE antennas in LTE radio 701. The LTE antennas in LTE radio 701 receive wireless LTE signals from UE 410 that transport Uplink (UL) LTE signaling, UL LTE data. The UL signaling indicates UE capabilities of UE 410 for different PLMNs. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the capabilities of UE 410, to home EPC 440 over the backhaul links. Home EPC 440 authenticates and authorizes service for UE 410. In response to the UE capabilities, Home EPC 440 retrieves network performance information for roaming 5GCs 441-442 from roaming 5GCs 441-442. In LTE BBU 702, the LTE RRC receives the DL S1-MME signaling that indicates the performance information for roaming 5GCs 441-442 and performance information for home EPC 440. The LTE PDCP transfers the UL LTE data to home EPC 440 over the backhaul links. The LTE PDCP receives DL LTE data from EPC 440.

The LTE network applications process the new DL LTE signaling and the DL LTE data to generate corresponding DL LTE symbols that carry the DL LTE signaling, DL LTE data, and the performance information. In LTE radio 701, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and performance information to UE 410.

LTE radio 701 receives a handover request from UE 410 to attach to a roaming access node of roaming 5GNR gNodeBs 431-432. LTE radio 701 transfers the handover request to the LTE RRC in LTE BBU 702 over the CPRI links. The LTE RRC transfers the handover request to home EPC 440 over the backhaul links. Home EPC 440 routes the handover request to the roaming 5GC associated with the selected candidate roaming access node. For example, if the handover request indicates the selected candidate roaming access node is roaming 5GNR gNodeB 431, then home EPC 440 routes the handover request to roaming 5GC 441. The selected roaming 5GC accepts the request. Home EPC 440 directs home the LTE RRC in BBU 702 to notify UE 410. The LTE RRC transfers a notification to UE 410 over LTE radio 701 that indicates that the handover request has been accepted. UE 410 detaches from home LTE eNodeB 430 and attaches to the selected candidate roaming access node of roaming 5GNR gNodeBs 431-432. UE 410 exchanges attachment signaling with the selected candidate roaming access node. UE 410 exchanges user data with the selected candidate roaming access node over the radio.

Figure 8:
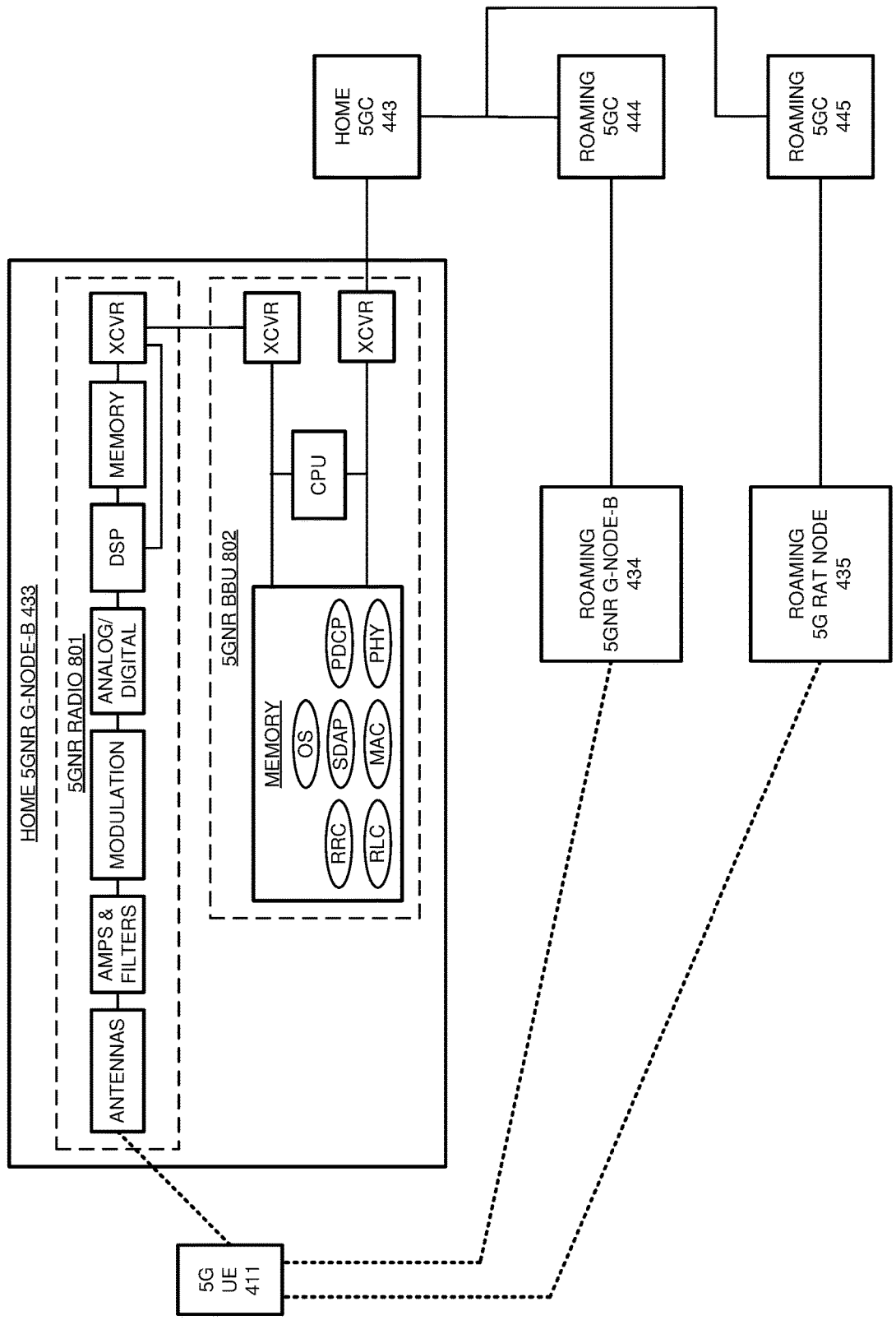
FIG. 8 illustrates a home 5GNR gNodeB to facilitate the handover of the 5G UE.

FIG. 8 illustrates home 5GNR gNodeB 433 to hand over 5G UE 411 based on network performance. Home 5GNR gNodeB 433 is an example of home access node 140, although home access node 140 may differ. Home 5GNR gNodeB 433 comprises 5GNR radio 801 and 5GNR BBU 802. 5GNR radio 801 comprises antennas, amplifiers, filters, modulation, analog-to-digital interfaces, DSP, memory, and transceivers that are coupled over bus circuitry. UE 411 is wirelessly coupled to the antennas in 5GNR radio 801 over a 5GNR link. The transceiver in 5GNR radio 801 is coupled to a transceiver in 5GNR BBU 802 over CPRI links. A transceiver in 5GNR BBU 802 is coupled to home 5GC over backhaul links. 5GNR BBU 802 comprises memories, CPUs, and transceivers that are coupled over bus circuitry. The memory in 5GNR BBU 803 stores operating systems (OS) and network applications like PHY, MAC, RLC, PDCP, RRC, and Service Data Adaptation Protocol (SDAP). The CPU in 5GNR BBU 803 executes the operating systems, PHYs, MACs, RLCs, PDCPs, SDAPs, and RRCs to exchange network signaling and user data with UE 411 and with home 5GC 443.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, 5G UE 411 wirelessly attaches to 5GNR radio 801. In 5GNR radio 801, the antennas receive wireless 5GNR signals from 5G UE 411 that transport UL 5GNR signaling and UL 5GNR data. The 5G UL signaling from UE 411 indicates UE capabilities of UE 411 for different PLMNs. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC in 5GNR BBU 802 processes the UL 5GNR signaling and DL N2 signaling from home 5GC 443 to generate new UL N2 signaling that indicates the UE capabilities for the different PLMNs and new DL 5GNR signaling. The 5GNR RRC transfers the new UL N2 signaling that indicates the UE capabilities for different PLMNs to home 5GC 443. The 5GNR SDAP in 5GNR BBU 802 transfers the UL 5GNR data to home 5GC 443 over backhaul links. In response to the UE capabilities, home 5GC 443 retrieves network performance information for roaming 5GCs 444-445 from home 5GCs 444-445.

In 5GNR BBU 802, the 5GNR RRC receives the DL N2 signaling from home 5GC 443 that indicates network performance information for home 5GC 443 and for roaming 5GCs 444-445. The 5GNR SDAP receives DL 5GNR data from home 5GC 443. The 5GNR network applications process the new DL 5GNR signaling and the DL 5GNR data to generate corresponding DL 5GNR symbols that carry the DL 5GNR signaling and DL 5GNR data. In 5GNR radio 801, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling that indicates the network performance information and the DL 5GNR data to 5G UE 411.

5GNR radio 801 receives a handover request from UE 411 to attach to a roaming access node of roaming 5GNR gNodeBs 434 and 5G RAT node 435. 5GNR radio 801 transfers the handover request to the 5GNR RRC in 5GNR BBU 802 over the CPRI links. The 5GNR RRC transfers the handover request to home 5GC 443 over the backhaul links. Home 5GC 443 routes the handover request to the roaming 5GC associated with the selected candidate roaming access node. For example, if the handover request indicates the selected candidate roaming access node is roaming 5GNR gNodeB 434, then home 5GC 443 routes the handover request to roaming 5GC 444. The selected roaming 5GC accepts the request. Home 5GC 443 directs home the 5GNR RRC in BBU 802 to notify UE 411. The 5GNR RRC transfers a notification to UE 411 over 5GNR radio 801 that indicates that the handover request has been accepted. UE 411 detaches from home 5GNR gNodeB 433 and attaches to the selected candidate roaming access node of roaming 5GNR gNodeB 434 and 5G RAT node 435. UE 411 exchanges attachment signaling with the selected candidate roaming access node. UE 411 exchanges user data with the selected candidate roaming access node over the radio.

Figure 9:
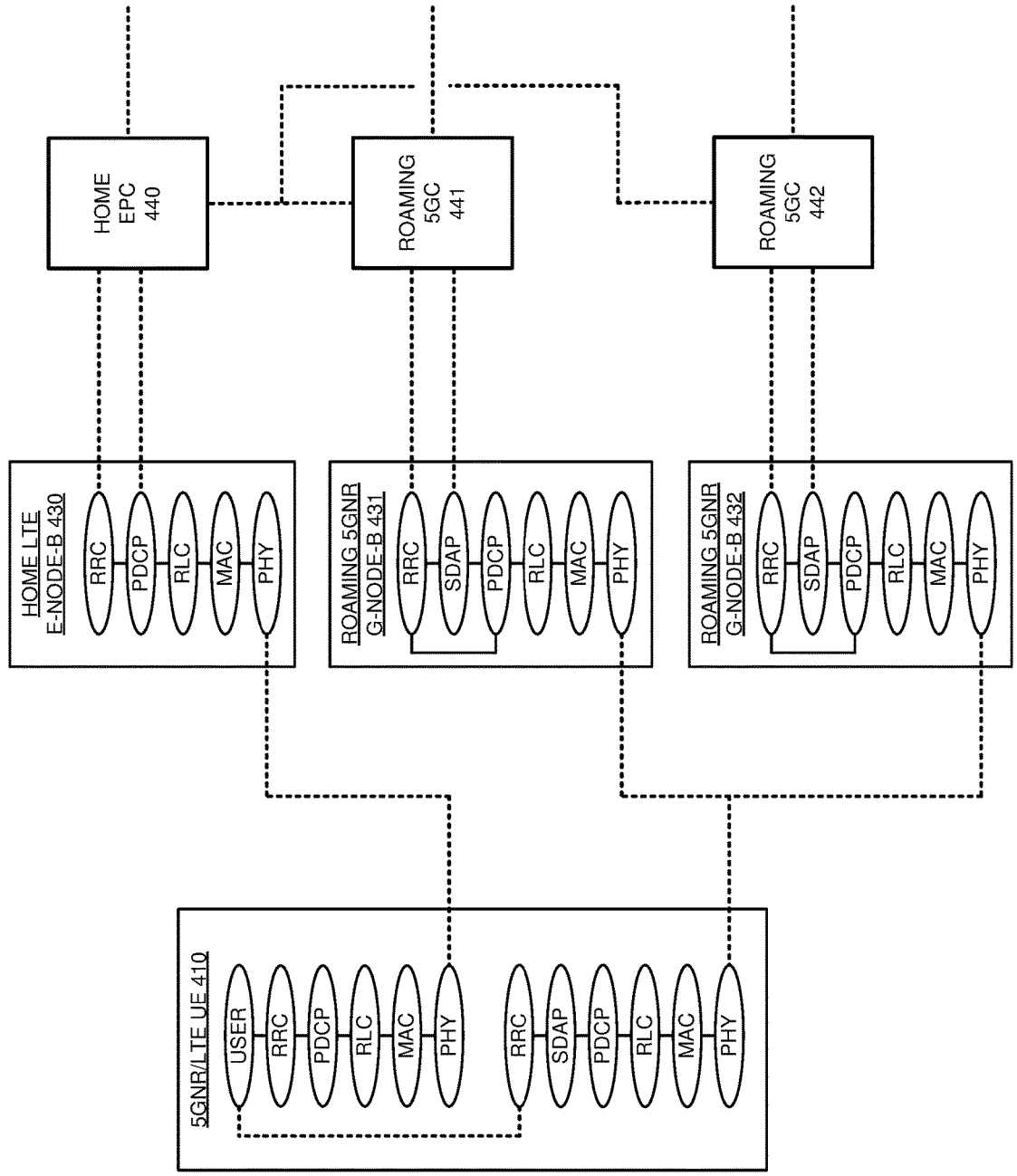
FIG. 9 illustrates an exemplary operation of the 5GNR/LTE UE, the home LTE eNodeB, and a home LTE Evolved Packet Core (EPC) to hand over the 5GNR/LTE UE based on network performance.

FIG. 9 illustrates an exemplary operation of 5GNR/LTE UE 410, Home LTE eNodeB 430, and home EPC 440 to hand over 5GNR/LTE UE 410 based on network performance. In 5GNR/LTE UE 410, a user application requests data communication, and the LTE RRC in UE 410 attaches to the LTE RRC in home LTE eNodeB 430 over the LTE PDCPs, RLCs, MACs, and PHYs. The LTE RRC in UE 410 indicates UE capabilities of UE 410 for different PLMNs to the LTE RRC in home LTE eNodeB 430. The LTE RRC in home LTE eNodeB 430 transfers S1-MME signaling to home EPC 440 that requests data services and indicates the UE capabilities of UE 410.

EPC 440 authenticates and authorizes UE 410 for wireless data services represented by APNs. In response to the authorization and the UE capabilities for different PLMNs, home EPC 440 retrieves network performance information for roaming 5GCs 441-442 from roaming 5GCs 441-442. Home EPC 440 selects QCIs and network addresses for UE 410 based on the APNs. Home EPC 440 transfers the APNs, QCIs, network address, performance information for home EPC 440, and the performance information roaming 5GCs 441-442 to the LTE RRC in home LTE eNodeB 430. The LTE RRC in home LTE eNodeB 430 transfers the APNs, QCIs, network address, and the performance information to the LTE RRC in UE 410 over the PDCPs, RLCs, MACs, and PHYs. EPC 440 exchanges the user data with the PDCP in home LTE eNodeB 430. The PDCP in home LTE eNodeB 430 exchanges the user data with the PDCP in UE 410 over the RLCs, MACs, and PHYs.

The LTE RRC in UE 410 directs the 5GNR RRC in UE 410 to drive the 5GNR PHY to measure signal strength for roaming 5GNR gNodeBs 431 and signal strength for roaming 5GNR gNodeB 432. The 5GNR PHY measures the signal strengths and transfers the received signal strengths for roaming 5GNR gNodeBs 431-432 to the LTE RRC. The LTE RRC determines candidate roaming access nodes based on the signal strengths of roaming 5GNR gNodeBs 431-432. For example, the LTE RRC may select roaming access nodes with high received signal strength as candidate roaming access nodes. The LTE RRC determines network performance differentials between home LTE eNodeB 430 and roaming 5GNR gNodeBs 431-432 based on the network performance information. For example, the LTE RRC may determine the amount interference for home LTE eNodeB 430 and for roaming 5GNR gNodeBs 431-432 the difference between the amounts of interference to determine the network performance differentials. The LTE RRC ranks the candidate roaming access nodes based on network performance differential. Typically, the LTE RRC ranks candidate roaming access nodes with a larger performance differential higher than candidate roaming access nodes with a smaller performance differential.

When the network performance differentials exceed a performance differential threshold, the LTE RRC generates a handover request to attach to the candidate roaming access node with the largest performance differential. The LTE RRC transfers the handover request to attach to the selected candidate roaming access node to the LTE RRC in home LTE eNodeB 430 over the PDCPs, RLCs, MACs, and PHYs. The LTE RRC in LTE eNodeB 430 transfers the handover request to home EPC 440. Home EPC 440 routes the handover request to the roaming 5GC associated with the selected candidate roaming access node. For example, if the handover request indicates the selected candidate roaming access node is roaming 5GNR gNodeB 431, then home EPC 440 routes the handover request to roaming 5GC 441. The selected roaming 5GC accepts the request. Home EPC 440 directs the LTE RRC in home LTE eNodeB 430 to notify UE 410. The LTE RRC in home LTE eNodeB 430 transfers a notification that indicates the accepted request to the LTE RRC in UE 410 over the PDCPs, RLCs, MACs, and PHYs.

The LTE RRC in UE 410 receives the notification and responsively detaches from the LTE RRC in home LTE eNodeB 430. The LTE RRC in UE 410 directs the 5GNR RRC in UE 410 to attach to the 5GRN RRC in the selected candidate roaming access node of roaming 5GNR gNodeBs 431-432. The 5GNR RRC in UE 410 exchanges attachment signaling with the 5GNR RRC in the selected candidate roaming access node of roaming 5GNR gNodeBs 431-432 over the SDAPs, PDCPs, RLCs, MACs, and PHYs. The 5GNR RRC attaches to the selected candidate roaming access node. The 5GNR SDAP exchanges user data with the 5GNR SDAP in the selected candidate roaming access node over the PDCPs, RLCs, MACs, and PHYs.

Figure 10:
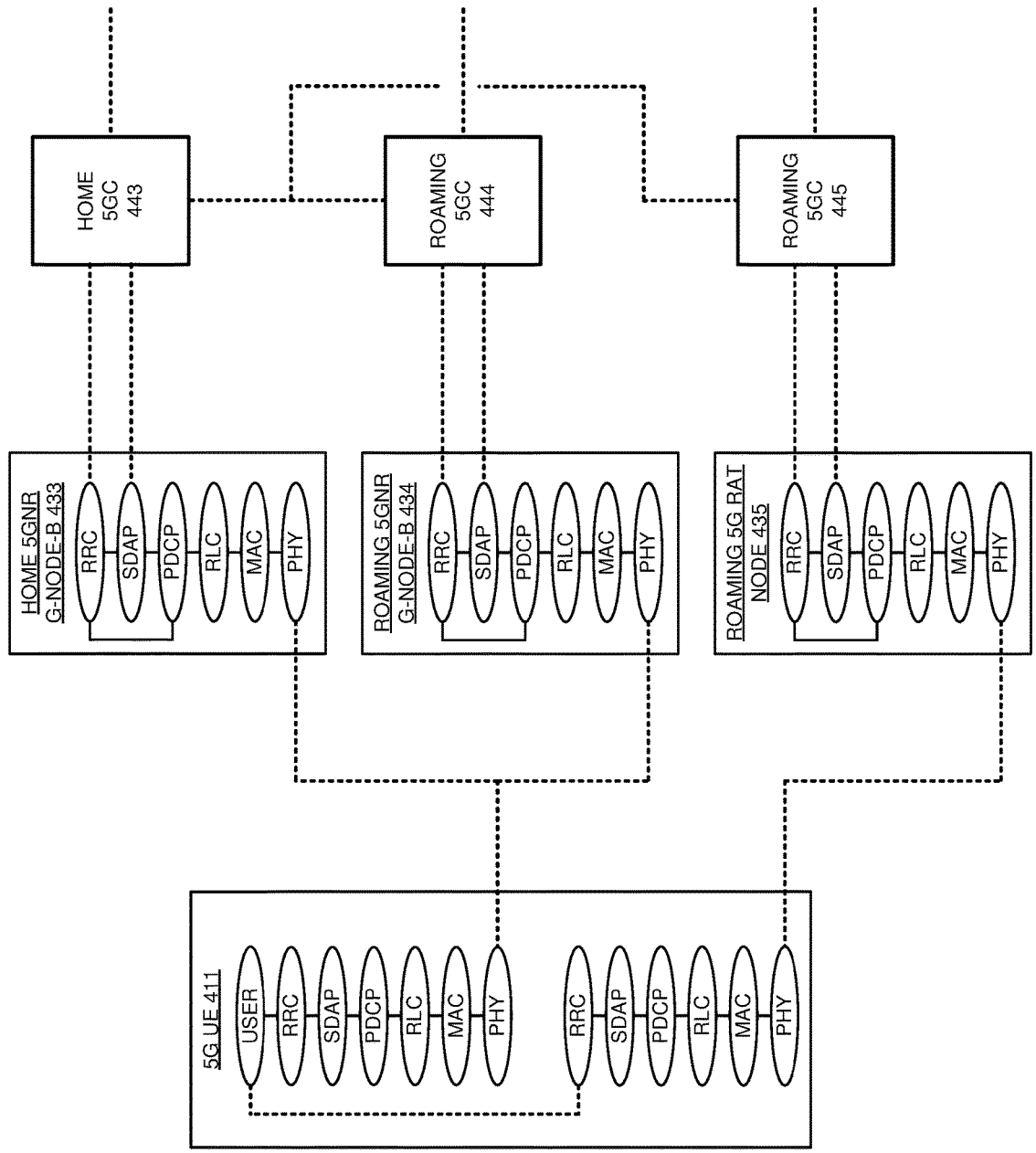
FIG. 10 illustrates an exemplary operation of the 5G UE, the home 5GNR gNodeB, and a home 5GNR Fifth Generation Core (5GC) to hand over the 5G UE based on network performance.

FIG. 10 illustrates an exemplary operation of 5G UE 411, home 5GNR gNodeB 433, and home 5GC to hand over UE 411 based on network performance. In 5G UE 411, a user application requests data communication, and the 5GNR RRC in UE 411 attaches to the 5GNR RRC in home 5GNR gNodeB 433 over the 5GNR SDAPs, PDCPs, RLCs, MACs, and PHYs. The 5GNR RRC in UE 411 indicates UE capabilities of UE 411 for different PLMNs to the 5GNR RRC in home 5GNR gNodeB 433. The 5GNR RRC in home 5GNR gNodeB 433 sends a request for data services for 5G UE 411 in N2 signaling to home 5GC 443 over the backhaul links. Home 5GC 443 authenticates and authorizes 5G UE 411 for data services. In response the UE capabilities of UE 410, home 5GC 410 requests performance information for roaming 5GCs 444-445 from the roaming 5GCs. Home 5GC 443 transfers quality-of-service metrics, network addressing, network performance information for home 5GC 443, and network performance information for 5GCs 444-445 to the 5GNR RRC in home 5GNR gNodeB 433 in N2 signaling. The 5GNR RRC in home 5GNR gNodeB 433 transfers the selected APNs, QCIs, network addresses, and network performance information to the 5GNR RRC in UE 411 over the SDAPs, PDCPs, RLCs, MACs, and PHYs.

The 5GNR RRC in UE 411 directs the 5GNR PHY to measure signal strength for roaming 5GNR gNodeB 434. The 5GNR RRC directs the 5G RAT RRC to drive the 5G RAT PHY to measure signal strength for roaming 5G RAT node 435. The 5GNR PHY and the 5G RAT PHY measure the signal strengths and transfer the signal strengths to the 5GNR RRC. The 5GNR RRC determines candidate roaming access nodes from roaming 5GNR gNodeB 434 and 5G RAT node 435 based on the received signal strengths. The 5GNR RRC determines a network performance differential between home 5GNR gNodeB 433 and roaming 5GNR gNodeB 434 and a network performance differential between home 5GNR gNodeB 433 and roaming 5G RAT node 435. The network performance differentials indicate differences in performance between home 5GNR gNodeB 433 and roaming nodes 434-435. For example, the network performance differentials may indicate differences in network error rate, throughput, band fading, intermodulation, interference, and/or other network performance indicators. The 5GNR RRC ranks the candidate roaming access nodes by network performance differential.

When the network performance differentials exceed a performance differential threshold, the 5GNR RRC generates a handover request to attach to the candidate roaming access node with the largest performance differential. The 5GNR RRC transfers the handover request to attach to the selected candidate roaming access node to the 5GNR RRC in home 5GNR gNodeB 433 over the SDAPs, PDCPs, RLCs, MACs, and PHYs. The 5GNR RRC in home 5GNR gNodeB 433 transfers the handover request to home 5GC 443 in N2 signaling. Home 5GC 443 routes the request the roaming 5GC associated with the selected roaming access node. When the selected roaming access node accepts the request, home 5GC 443 directs the 5GNR RRC in home 5GNR gNodeB 433 to notify UE 411. The 5GNR RRC transfers a notification indicating the accepted request to the 5GNR RRC in UE 411 over the SDAPs, PDCPs, RLCs, MACs, and PHYs.

The 5GNR RRC in UE 411 receives the notification that the handover request is accepted and detaches from the 5GNR RRC in home 5GNR gNodeB 433. The 5GNR RRC attaches to the 5GNR RRC in the selected candidate roaming access node. In some examples, the 5GNR RRC drives the 5G RAT RRC to attach when the selected candidate roaming access node is roaming 5G RAT node 435. The corresponding RRCs in UE 411 exchange attachment signaling with the corresponding RRCs in the selected candidate roaming access node. The corresponding SDAPs exchange user data with the corresponding SDAPs in the selected candidate roaming access node.

The wireless data network circuitry described above comprises computer hardware and software that form special-purpose network circuitry to hand over wireless UEs based network performance differentials. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to hand over wireless UEs based on network performance differentials.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to select wireless networks, the method comprising:
    wirelessly indicating UE capabilities to a home wireless network;
    in response to indicating the UE capabilities to the home wireless network, wirelessly receiving, from the home wireless network, performance information for the home wireless network and for roaming wireless networks, wherein the performance information comprises data throughput and error rate;
    measuring signal strength for the roaming wireless networks;
    determining candidate ones of the roaming wireless networks based on the signal strength for the roaming wireless networks;
    determining performance differentials between the performance information for the home wireless network and the performance information for each of the candidate ones of the roaming wireless networks;
    ranking the candidate ones of the roaming wireless networks based on the performance differentials;
    determining that at least one of the candidate ones of the roaming wireless networks exceeds a performance differential threshold;
    selecting a highest ranked one of the candidate ones of the roaming wireless networks that exceeded the performance differential threshold; and
    wirelessly exchanging data with the selected one of the candidate ones of the roaming wireless networks.

2. The method of claim 1 wherein the performance information comprises data throughput, error rate, and band fading.

3. The method of claim 1 wherein the performance information comprises data throughput, error rate, and intermodulation.

4. The method of claim 1 wherein the performance information comprises data throughput, error rate, band fading, and intermodulation.

5. The method of claim 1 wherein the home network comprises a Fifth Generation New Radio (5GNR) home network and the roaming network comprise 5GNR roaming networks and Long Term Evolution (LTE) roaming networks.

6. The method of claim 1 wherein wirelessly receiving the performance information comprises wirelessly receiving the performance information in a System Information Block (SIB).

7. The method of claim 1 further comprising retrieving historical performance data from a memory; and wherein: a portion of the performance information for the home wireless network and for the roaming wireless networks comprises the historical performance data.

8. A method of operating a wireless user device to select wireless networks, the method comprising:
    the wireless user device wirelessly indicating UE capabilities to a home wireless network;
    in response to indicating the UE capabilities to the home wireless network, the wireless user device wirelessly receiving, from the home wireless network, performance information for the home wireless network and for roaming wireless networks, wherein the performance information comprises data throughput and error rate;
    the wireless user device determining signal strength for the roaming wireless networks;
    the wireless user device identifying candidate ones of the roaming wireless networks based on the signal strength for the roaming wireless networks;
    the wireless user device determining performance differentials between the performance information for the home wireless network and the performance information for each of the candidate ones of the roaming wireless networks;
    the wireless user device ranking the candidate ones of the roaming wireless networks based on the performance differentials;
    the wireless user device determining that at least one of the candidate ones of the roaming wireless networks exceeds a performance differential threshold;
    the wireless user device selecting a highest ranked one of the candidate ones of the roaming wireless networks that exceeded the performance differential threshold; and
    the wireless user device wirelessly exchanging data with the selected one of the candidate ones of the roaming wireless networks.

9. The method of claim 8 wherein the performance information comprises data throughput, error rate, and band fading.

10. The method of claim 8 wherein the performance information comprises data throughput, error rate, and intermodulation.

11. The method of claim 8 wherein the performance information comprises data throughput, error rate, band fading, and intermodulation.

12. The method of claim 8 wherein the home network comprises a Fifth Generation New Radio (5GNR) home network and the roaming network comprise 5GNR roaming networks and Long Term Evolution (LTE) roaming networks.

13. The method of claim 8 wherein the wireless user device wirelessly receiving the performance information comprises wirelessly receiving the performance information in a System Information Block (SIB).

14. The method of claim 8 further comprising retrieving historical performance data from a memory; and wherein: a portion of the performance information for the home wireless network and for the roaming wireless networks comprises the historical performance data.

15. A wireless user device to select wireless networks, the wireless user device comprising:
    one or more radios to wirelessly indicate UE capabilities to a home wireless network;
    in response to indicating the UE capabilities to the home wireless network, the one or more radios to wirelessly receive, from the home wireless network, performance information for the home wireless network and for roaming wireless networks, wherein the performance information comprises data throughput and error rate;

the one or more radios to determine signal strength for the roaming wireless networks;

processing circuitry to identify candidate ones of the roaming wireless networks based on the signal strength for the roaming wireless networks;

the processing circuitry to determine performance differentials between the performance information for the home wireless network and the performance information for each of the candidate ones of the roaming wireless networks;

the processing circuitry to rank the candidate ones of the roaming wireless networks based on the performance differentials;

the processing circuitry to determine that at least one of the candidate ones of the roaming wireless networks exceeds a performance differential threshold;

the processing circuitry to select a highest ranked one of the candidate ones of the roaming wireless networks that exceeded the performance differential threshold; and the one or more radios to wirelessly exchange data with the selected one of the candidate ones of the roaming wireless networks.

16. The wireless user device of claim 15 wherein the performance information comprises data throughput, error rate, and band fading.

17. The wireless user device of claim 15 wherein the performance information comprises data throughput, error rate, and intermodulation.

18. The wireless user device of claim 15 wherein the performance information comprises data throughput, error rate, band fading, and intermodulation.

19. The wireless user device of claim 15 wherein the home network comprises a Fifth Generation New Radio (5GNR) home network and the roaming network comprise 5GNR roaming networks and Long Term Evolution (LTE) roaming networks.

20. The wireless user device of claim 15 wherein the one or more radios is to wirelessly receive the performance information in a System Information Block (SIB).

* * * * *